G. W. NAYLOR & L. F. AUTRY.
SAW SETTING TOOL.
APPLICATION FILED NOV. 24, 1913.
1,099,097.
Patented June 2, 1914.
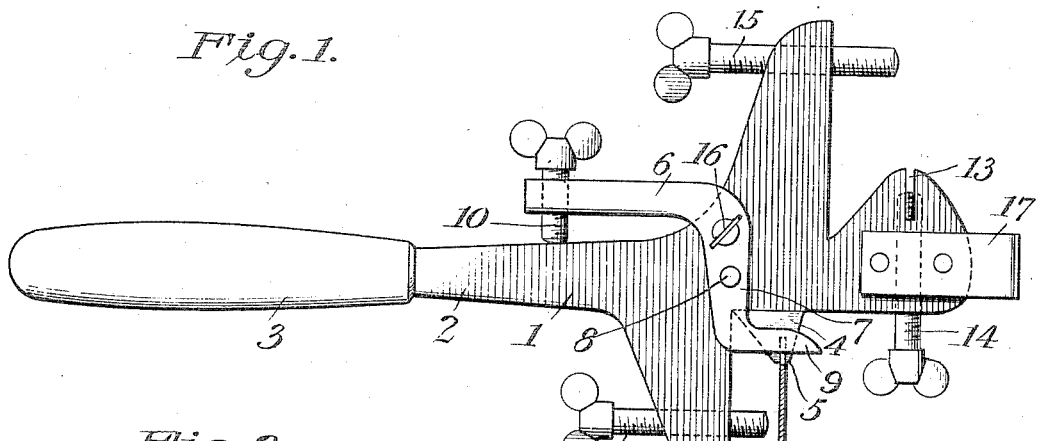
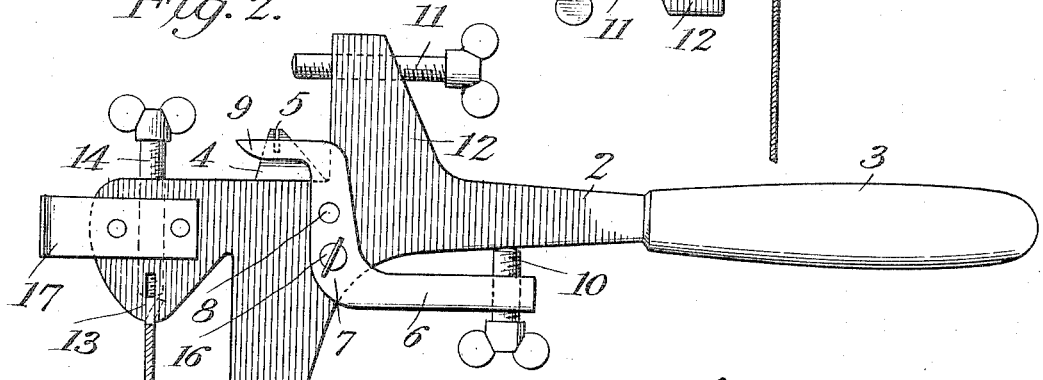
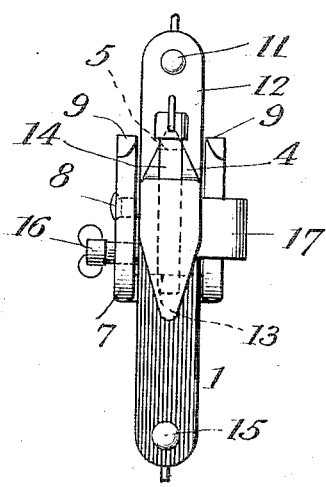
Witnesses
Fenton S. Belt
J. N. Sherwood
Inventors,
George W. Naylor and
Leon F. Autry
By Franklin N. Hough
Attorney

UNITED STATES PATENT OFFICE.

GEORGE W. NAYLOR AND LEON F. AUTRY, OF DUNN, NORTH CAROLINA.

SAW-SETTING TOOL.

1,099,097.

Specification of Letters Patent.

Patented June 2, 1914.

Application filed November 24, 1913. Serial No. 802,803.

*To all whom it may concern:*

Be it known that we, GEORGE W. NAYLOR and LEON F. AUTRY, citizens of the United States, residing at Dunn, in the county of Harnett and State of North Carolina, have invented certain new and useful Improvements in Saw-Setting Tools; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in saw setting tools and it has for its object the provision of a tool of this character which is designed for use in setting saws of various kinds and sizes.

To this end and to such others as the invention may pertain, the same consists in the novel construction and peculiar combination, arrangement and adaptation of parts, all as will be more fully described, shown in the accompanying drawings and then specifically defined in the appended claim.

The invention is clearly illustrated in the accompanying drawings, in which:—

Figure 1 is a side elevation of a saw setting tool constructed in accordance with our invention, the device being in the position required in setting an ordinary hand saw. Fig. 2 is a similar view of the tool, the same being shown as inverted and in the position in which it is used in setting a cross cut saw, and Fig. 3 is an edge view of the device.

Reference now being had to the details of the drawings by numeral, 1 designates the head or body portion of the device provided with a lateral extension 2 to which is attached an operating handle 3. A lateral extension 4 is provided with a kerf or slot 5 to receive the teeth of the saw to be operated upon.

6 designates the limit gage proper and comprises the body portion 7, the bifurcated arms of which are pivoted to the head of the tool upon a transverse pivot 8, the free ends of the said arms being beveled as shown at 9 and adapted to bear against the edge of the saw.

10 is a set screw passed through the body portion of the setting device, the free end of the screw having a bearing against the side of the shank of the tool, this screw being adapted to regulate the depth of the set of the saw as will be readily understood. The width of the set is regulated by a set screw 11 which extends through the arm 12 of the tool in a direction at right angles to the blade of the saw, the office of this screw being to regulate the width of the set imparted to the teeth of the saw.

Provided at a point adjacent to the upper end of the tool and upon the side opposite the side which is provided with the slot 5, designed for use in the setting of the teeth of the hand saws, is a slot 13 designed for use in setting teeth of cross cut saws.

The construction of the device in its application to setting cross cut saw teeth is similar in all respects to that described for the setting of hand saws, excepting that the slot or kerf 13 is larger than is required in the hand saw setting. In the setting of a cross cut saw, the depth of the set is regulated by means of a set screw 14, while the width of the set is adjusted by means of a set screw 15.

16 is a set screw passing through the side wall of the bifurcated saw set, the set screw having a bearing against the face of the head of the tool and serves to lock the set in its adjusted position. At the extreme end of the head portion of the tool a metallic scraper block 17 is secured, the office of this device being to serve as a scraper in removing the gum from the face of the saw.

From the foregoing description, the operation of the device will be readily understood. If it is designed to use the device for setting an ordinary hand saw, the teeth of the saw are inserted within the kerf 5 and the saw is adjusted in position by securing the proper depth and width of the set by means of the screws 10 and 11 respectively. The bifurcated and pivoted saw gaging member 6 having been properly adjusted is locked in its adjusted position by means of the set screw 16. When thus secured in a position relative to the saw blade to be operated upon, it will be noted that a downward movement imparted to the tool by means of the operating handle will serve to set the tooth of the saw which is held within the kerf. The saw is then removed and the next succeeding tooth is similarly operated upon. In heavier saws, such as a cross cut saw, this operation is repeated, the teeth of the saw being inserted in the kerf provided at the upper end and the tool is adjusted to its use upon the saw by means of the set screws provided for the purpose.

What we claim to be new is:—

A saw setting tool comprising a head with a handle projecting therefrom, a set screw mounted in a threaded aperture in an extension, a forked limit gage having angled arms, a thumb screw mounted in a threaded aperture in one of said arms and adapted to bear against the face of the head, a thumb screw mounted in the gage and bearing against the edge of said handle, the edge of the head having a tapering lug with slot in the end, the free ends of the arms of the gage set positioned adjacent to said tapering lug, as set forth.

In testimony whereof we hereunto affix our signatures in presence of two witnesses.

GEORGE W. NAYLOR.
LEON F. AUTRY.

Witnesses:
 FRANK HODGES,
 J. C. HODGES.